(12) United States Patent
Lam et al.

(10) Patent No.: US 7,806,975 B2
(45) Date of Patent: Oct. 5, 2010

(54) FRICTION MATERIAL

(75) Inventors: Robert C. Lam, Rochester, MI (US);
Feng Dong, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 553 days.

(21) Appl. No.: 11/410,722

(22) Filed: Apr. 25, 2006

(65) Prior Publication Data
US 2006/0241207 A1 Oct. 26, 2006

Related U.S. Application Data

(60) Provisional application No. 60/674,934, filed on Apr. 26, 2005, provisional application No. 60/723,314, filed on Oct. 4, 2005.

(51) Int. Cl.
C08J 5/14 (2006.01)
C09K 3/14 (2006.01)
C09K 3/18 (2006.01)

(52) U.S. Cl. .......................... 106/36; 523/149
(58) Field of Classification Search .......... 106/36; 428/304.4, 306.6, 317.9, 312.6; 523/149
See application file for complete search history.

(56) References Cited

U.S. PATENT DOCUMENTS

| | | | |
|---|---|---|---|
| 1,039,168 A | 9/1912 | Melton | |
| 1,682,198 A | 8/1928 | Sitton | |
| 1,860,147 A | 5/1932 | Hadley | |
| 2,100,347 A | 11/1937 | Nanfeldt | |
| 2,182,208 A | 12/1939 | Nason | |
| 2,221,893 A | 11/1940 | White | |
| 2,307,814 A | 1/1943 | Walters | |
| 2,316,874 A | 4/1943 | Kraft | |
| 2,354,526 A | 7/1944 | Lapsley et al. | |
| 2,516,544 A | 7/1950 | Breeze | |
| 2,555,261 A | 5/1951 | Walters | |
| 2,702,770 A | 2/1955 | Steck | |
| 2,749,264 A | 6/1956 | Emrick | |
| 2,779,668 A | 1/1957 | Daniels | |
| 3,020,139 A | 2/1962 | Camp et al. | |

(Continued)

FOREIGN PATENT DOCUMENTS

JP 5247233 * 9/1993
JP 05247233 * 9/1993

OTHER PUBLICATIONS

U.S. Appl. No. 12/185,236; Friction Material With Silicon, Feng Dong, Filed Aug. 4, 2008.

(Continued)

*Primary Examiner*—Anthony J Green
*Assistant Examiner*—Pegah Parvini
(74) *Attorney, Agent, or Firm*—Reising Ethington P.C.

(57) ABSTRACT

This friction material has a fibrous base material and preferably is a wet friction material for use in a fluid environment. The fibers have a small diameter and a high tensile modulus resulting in flexible fibers that performs well in a high temperature, high pressure fluid environment. The fibers have a diameter ranging from 1 to 20 micrometers and a tensile modulus greater than 70 Gpa. In the preferred embodiment, the small diameter fibers are small diameter carbon fibers or small diameter mineral fibers.

35 Claims, 8 Drawing Sheets

U.S. PATENT DOCUMENTS

| | | |
|---|---|---|
| 3,080,028 A | 3/1963 | Kennedy |
| 3,215,648 A | 11/1965 | Duffy |
| 3,270,846 A | 9/1966 | Arledter et al. |
| 3,429,766 A | 2/1969 | Stormfeltz |
| 3,520,390 A | 7/1970 | Bentz |
| 3,526,306 A | 9/1970 | Bentz |
| 3,578,122 A | 5/1971 | Magnier |
| 3,654,777 A | 4/1972 | Grundman |
| 3,746,669 A | 7/1973 | Dunnom |
| 3,871,934 A | 3/1975 | Marin |
| 3,885,006 A | 5/1975 | Hatch et al. |
| 3,899,050 A | 8/1975 | Savary et al. |
| 3,911,045 A | 10/1975 | Hartmann et al. |
| 3,927,241 A | 12/1975 | Augustin |
| 3,944,686 A | 3/1976 | Froberg |
| 3,950,047 A | 4/1976 | Capelli |
| 3,980,729 A | 9/1976 | Yokokawa et al. |
| 4,002,225 A | 1/1977 | Marin |
| 4,020,226 A | 4/1977 | Andrianov et al. |
| 4,033,437 A | 7/1977 | Labat |
| 4,045,608 A | 8/1977 | Todd |
| 4,051,097 A | 9/1977 | Aldrich |
| 4,084,863 A | 4/1978 | Capelli |
| 4,098,630 A | 7/1978 | Morse |
| 4,113,894 A | 9/1978 | Koch, II |
| 4,150,188 A | 4/1979 | Brulet |
| 4,175,070 A * | 11/1979 | Klein et al. ............... 523/153 |
| 4,197,223 A | 4/1980 | Bartram |
| 4,209,086 A | 6/1980 | Friedrich |
| 4,226,906 A | 10/1980 | Jacob |
| 4,239,666 A | 12/1980 | Jacko et al. |
| 4,256,801 A | 3/1981 | Chuluda |
| 4,259,397 A | 3/1981 | Saito et al. |
| 4,260,047 A | 4/1981 | Nels |
| 4,267,912 A | 5/1981 | Bauer et al. |
| 4,291,794 A | 9/1981 | Bauer |
| 4,320,823 A | 3/1982 | Covaleski |
| 4,324,706 A | 4/1982 | Tabe et al. |
| 4,352,750 A | 10/1982 | Eschen |
| 4,373,038 A | 2/1983 | Moraw et al. |
| 4,374,211 A | 2/1983 | Gallagher et al. |
| 4,396,100 A | 8/1983 | Eltze |
| 4,444,574 A | 4/1984 | Tradewell et al. |
| 4,451,590 A | 5/1984 | Fujimaki et al. |
| 4,453,106 A | 6/1984 | La Fiandra |
| 4,456,650 A | 6/1984 | Melotik et al. |
| 4,457,967 A | 7/1984 | Chareire et al. |
| 4,490,432 A | 12/1984 | Jordan |
| 4,514,541 A | 4/1985 | Frances |
| 4,522,290 A | 6/1985 | Klink |
| 4,524,169 A | 6/1985 | Wolff et al. |
| 4,543,106 A | 9/1985 | Parekh |
| 4,563,386 A | 1/1986 | Schwartz |
| 4,593,802 A | 6/1986 | Danko, Jr. |
| 4,628,001 A | 12/1986 | Sasaki et al. |
| 4,639,392 A | 1/1987 | Nels et al. |
| 4,646,900 A | 3/1987 | Crawford et al. |
| 4,656,203 A | 4/1987 | Parker |
| 4,657,951 A | 4/1987 | Takarada et al. |
| 4,663,230 A | 5/1987 | Tennent |
| 4,663,368 A | 5/1987 | Harding et al. |
| 4,672,082 A | 6/1987 | Nakagawa et al. |
| 4,674,616 A | 6/1987 | Mannino, Jr. |
| 4,694,937 A | 9/1987 | Jonas |
| 4,698,889 A | 10/1987 | Patzer et al. |
| 4,700,823 A | 10/1987 | Winckler |
| 4,726,455 A | 2/1988 | East |
| 4,732,247 A | 3/1988 | Frost |
| 4,742,723 A | 5/1988 | Lanzerath et al. |
| 4,743,634 A | 5/1988 | Royer |
| 4,770,283 A | 9/1988 | Putz et al. |
| 4,772,508 A | 9/1988 | Brassell |
| 4,792,361 A | 12/1988 | Double et al. |
| 4,861,809 A | 8/1989 | Ogawa et al. |
| 4,878,282 A | 11/1989 | Bauer |
| 4,913,267 A | 4/1990 | Campbell et al. |
| 4,915,856 A | 4/1990 | Jamison |
| 4,917,743 A | 4/1990 | Gramberger et al. |
| 4,918,116 A | 4/1990 | Gardziella et al. |
| 4,927,431 A | 5/1990 | Buchanan et al. |
| 4,950,530 A | 8/1990 | Shibatani |
| 4,951,798 A | 8/1990 | Knoess |
| 4,983,457 A | 1/1991 | Hino et al. |
| 4,986,397 A | 1/1991 | Vierk |
| 4,995,500 A | 2/1991 | Payvar |
| 4,997,067 A | 3/1991 | Watts |
| 5,004,497 A | 4/1991 | Shibata et al. |
| 5,017,268 A | 5/1991 | Clitherow et al. |
| 5,033,596 A | 7/1991 | Genise |
| 5,038,628 A | 8/1991 | Kayama |
| 5,076,882 A | 12/1991 | Oyanagi et al. |
| 5,080,969 A | 1/1992 | Tokumura |
| 5,083,650 A | 1/1992 | Seiz et al. |
| 5,093,388 A | 3/1992 | Siemon, Jr. et al. |
| 5,094,331 A | 3/1992 | Fujimoto et al. |
| 5,101,953 A | 4/1992 | Payvar |
| 5,105,522 A | 4/1992 | Gramberger et al. |
| 5,143,192 A | 9/1992 | Vojacek et al. |
| 5,164,256 A | 11/1992 | Sato et al. |
| 5,211,068 A | 5/1993 | Spitale et al. |
| 5,221,401 A | 6/1993 | Genise |
| 5,233,736 A | 8/1993 | Hill |
| 5,259,947 A | 11/1993 | Kalback et al. |
| 5,266,395 A | 11/1993 | Yamashita et al. |
| 5,269,400 A | 12/1993 | Fogelberg |
| 5,290,627 A | 3/1994 | Ikuta |
| 5,313,793 A | 5/1994 | Kirkwood et al. |
| 5,332,075 A | 7/1994 | Quigley et al. |
| 5,335,765 A | 8/1994 | Takakura et al. |
| 5,354,603 A | 10/1994 | Errede et al. |
| 5,376,425 A | 12/1994 | Asano et al. |
| 5,395,864 A | 3/1995 | Miyoshi et al. |
| 5,396,552 A | 3/1995 | Jahn et al. |
| 5,437,780 A | 8/1995 | Southard et al. |
| 5,439,087 A | 8/1995 | Umezawa |
| 5,453,317 A | 9/1995 | Yesnik |
| 5,455,060 A * | 10/1995 | Neamy et al. ............... 427/2.31 |
| 5,460,255 A | 10/1995 | Quigley et al. |
| 5,472,995 A | 12/1995 | Kaminski et al. |
| 5,474,159 A | 12/1995 | Soennecken et al. |
| 5,478,642 A | 12/1995 | McCord |
| 5,501,788 A | 3/1996 | Romine et al. |
| 5,520,866 A | 5/1996 | Kaminski et al. |
| 5,529,666 A | 6/1996 | Yesnik |
| 5,540,621 A | 7/1996 | Keester et al. |
| 5,540,832 A | 7/1996 | Romino |
| 5,540,903 A | 7/1996 | Romine |
| 5,571,372 A | 11/1996 | Miyaishi et al. |
| 5,573,579 A * | 11/1996 | Nakanishi et al. ............. 106/36 |
| 5,585,166 A | 12/1996 | Kearsey |
| 5,615,758 A | 4/1997 | Nels |
| 5,620,075 A | 4/1997 | Larsen et al. |
| 5,639,804 A | 6/1997 | Yesnik |
| 5,646,076 A | 7/1997 | Bortz |
| 5,648,041 A | 7/1997 | Rodgers et al. |
| 5,662,993 A | 9/1997 | Winckler |
| 5,670,231 A | 9/1997 | Ohya et al. |
| 5,671,835 A | 9/1997 | Tanaka et al. |
| 5,674,947 A | 10/1997 | Oishi et al. |
| 5,676,577 A | 10/1997 | Lam et al. |
| 5,705,120 A | 1/1998 | Ueno et al. |
| 5,707,905 A | 1/1998 | Lam et al. |
| 5,718,855 A | 2/1998 | Akahori et al. |
| 5,733,176 A | 3/1998 | Robinson et al. |

| | | |
|---|---|---|
| 5,753,018 A | 5/1998 | Lamport et al. |
| 5,753,356 A | 5/1998 | Lam et al. |
| 5,766,523 A | 6/1998 | Rodgers et al. |
| 5,771,691 A | 6/1998 | Kirkwood et al. |
| 5,775,468 A | 7/1998 | Lam et al. |
| 5,776,288 A | 7/1998 | Stefanutti et al. |
| 5,777,791 A | 7/1998 | Hedblom |
| 5,792,544 A | 8/1998 | Klein |
| 5,803,210 A | 9/1998 | Kohno et al. |
| 5,816,901 A | 10/1998 | Sirany |
| 5,827,610 A | 10/1998 | Ramachandran |
| 5,834,551 A | 11/1998 | Haraguchi et al. |
| 5,842,551 A | 12/1998 | Nels |
| 5,845,754 A | 12/1998 | Weilant |
| 5,856,244 A | 1/1999 | Lam et al. |
| 5,858,166 A | 1/1999 | James et al. |
| 5,858,883 A | 1/1999 | Lam et al. |
| 5,889,082 A | 3/1999 | Kaminski et al. |
| 5,895,716 A | 4/1999 | Fiala et al. |
| 5,897,737 A | 4/1999 | Quigley |
| 5,919,528 A | 7/1999 | Huijs et al. |
| 5,919,837 A | 7/1999 | Kaminski et al. |
| 5,952,249 A | 9/1999 | Gibson et al. |
| 5,958,507 A | 9/1999 | Lam et al. |
| 5,965,658 A * | 10/1999 | Smith et al. ............... 524/496 |
| 5,975,270 A | 11/1999 | Tokune et al. |
| 5,975,988 A | 11/1999 | Christianson |
| 5,989,375 A | 11/1999 | Bortz |
| 5,989,390 A | 11/1999 | Lee |
| 5,998,307 A | 12/1999 | Lam et al. |
| 5,998,311 A | 12/1999 | Nels |
| 6,000,510 A | 12/1999 | Kirkwood et al. |
| 6,001,750 A * | 12/1999 | Lam ............................ 442/72 |
| 6,019,205 A | 2/2000 | Willworth |
| 6,042,935 A | 3/2000 | Krenkel et al. |
| 6,060,536 A | 5/2000 | Matsumoto et al. |
| 6,065,579 A | 5/2000 | Nels |
| 6,074,950 A | 6/2000 | Wei |
| 6,121,168 A | 9/2000 | Irifune et al. |
| 6,123,829 A | 9/2000 | Zommerman et al. |
| 6,130,176 A | 10/2000 | Lam |
| 6,132,877 A | 10/2000 | Winckler et al. |
| 6,140,388 A | 10/2000 | Nass et al. |
| 6,163,636 A | 12/2000 | Stentz et al. |
| 6,182,804 B1 | 2/2001 | Lam |
| 6,194,059 B1 | 2/2001 | Yesnik |
| 6,217,413 B1 | 4/2001 | Christianson |
| 6,231,977 B1 | 5/2001 | Suzuki et al. |
| 6,265,066 B1 | 7/2001 | Suzuki et al. |
| 6,284,815 B1 | 9/2001 | Sasahara et al. |
| 6,291,040 B1 | 9/2001 | Moriwaki et al. |
| 6,315,974 B1 | 11/2001 | Murdie et al. |
| 6,316,086 B1 | 11/2001 | Beier et al. |
| 6,323,160 B1 | 11/2001 | Murdie et al. |
| 6,331,358 B1 * | 12/2001 | Kitahara et al. ............. 428/447 |
| 6,352,758 B1 | 3/2002 | Huang et al. |
| 6,383,605 B1 | 5/2002 | Ejiri |
| 6,387,531 B1 | 5/2002 | Bi et al. |
| 6,423,668 B1 * | 7/2002 | Nakanishi et al. ........... 508/101 |
| 6,432,151 B1 | 8/2002 | So et al. |
| 6,432,187 B1 | 8/2002 | Ogawa et al. |
| 6,524,681 B1 | 2/2003 | Seitz et al. |
| 6,569,816 B2 | 5/2003 | Oohira et al. |
| 6,586,373 B2 | 7/2003 | Suzuki et al. |
| 6,601,321 B1 | 8/2003 | Kendall |
| 6,608,225 B1 | 8/2003 | Larson et al. |
| 6,630,416 B1 * | 10/2003 | Lam et al. ................... 442/417 |
| 6,638,883 B2 | 10/2003 | Gaffney et al. |
| 6,652,363 B2 | 11/2003 | Kramer et al. |
| 6,668,891 B2 | 12/2003 | Collis |
| 6,703,117 B2 | 3/2004 | Gruber et al. |
| 6,831,146 B2 | 12/2004 | Aiba et al. |
| 6,855,410 B2 | 2/2005 | Buckley |
| 6,875,711 B2 | 4/2005 | Chen et al. |
| 6,951,504 B2 | 10/2005 | Adefris et al. |
| 7,014,027 B2 | 3/2006 | Adair et al. |
| 7,160,913 B2 | 1/2007 | Schneider |
| 7,208,432 B1 | 4/2007 | Beier et al. |
| 7,294,388 B2 | 11/2007 | Lam et al. |
| 7,332,240 B2 | 2/2008 | O'Hara et al. |
| 7,429,418 B2 | 9/2008 | Lam et al. |
| 2002/0068164 A1 | 6/2002 | Martin |
| 2002/0164473 A1 | 11/2002 | Buckley |
| 2003/0050831 A1 | 3/2003 | Klayh |
| 2003/0053735 A1 | 3/2003 | Vernooy |
| 2003/0134098 A1 | 7/2003 | Bauer et al. |
| 2003/0154882 A1 * | 8/2003 | Nagata et al. ................. 106/36 |
| 2004/0006192 A1 | 1/2004 | Aiba et al. |
| 2004/0033341 A1 | 2/2004 | Lam et al. |
| 2004/0043193 A1 | 3/2004 | Chen et al. |
| 2004/0043243 A1 | 3/2004 | Chen et al. |
| 2004/0081795 A1 | 4/2004 | Wang et al. |
| 2004/0081813 A1 | 4/2004 | Dong |
| 2004/0192534 A1 | 9/2004 | Nixon et al. |
| 2004/0198866 A1 | 10/2004 | Sasaki |
| 2004/0224864 A1 | 11/2004 | Patterson et al. |
| 2005/0004258 A1 | 1/2005 | Yamamoto et al. |
| 2005/0025967 A1 | 2/2005 | Lawton et al. |
| 2005/0039872 A1 | 2/2005 | Kimura et al. |
| 2005/0064778 A1 | 3/2005 | Lam et al. |
| 2005/0074595 A1 | 4/2005 | Lam |
| 2005/0075019 A1 | 4/2005 | Lam et al. |
| 2005/0075021 A1 | 4/2005 | Lam et al. |
| 2005/0075022 A1 | 4/2005 | Lam |
| 2005/0075413 A1 | 4/2005 | Lam |
| 2005/0075414 A1 | 4/2005 | Lam et al. |
| 2005/0191477 A1 | 9/2005 | Dong |
| 2005/0271876 A1 | 12/2005 | Walker et al. |
| 2005/0281971 A1 | 12/2005 | Lam et al. |
| 2006/0008635 A1 | 1/2006 | Dong et al. |
| 2006/0019085 A1 | 1/2006 | Lam et al. |
| 2006/0062987 A1 | 3/2006 | Niewohner et al. |
| 2006/0121263 A1 | 6/2006 | Komori et al. |
| 2006/0151912 A1 | 7/2006 | Bauer |
| 2006/0241207 A1 | 10/2006 | Lam et al. |
| 2007/0011951 A1 | 1/2007 | Gaeta et al. |
| 2007/0062777 A1 | 3/2007 | Zagrodzki et al. |
| 2007/0117881 A1 | 5/2007 | Watanabe et al. |
| 2007/0205076 A1 | 9/2007 | Takahashi et al. |

OTHER PUBLICATIONS

U.S. Appl. No. 10/871,786; Fully Fibrous Structure Friction Material, Robert C. Lam, Filed Jun. 18, 2004.
U.S. Appl. No. 12/225,014, Friction Materials Made With Resins Containing Polar Functional Groups, Timothy P. Newcomb, Filed Sep. 10, 2008.
U.S. Appl. No. 10/678,720, Friction Material Containing Partially Carbonized Carbon Fibers, Robert C. Lam, Filed Oct. 3, 2003.
U.S. Appl. No. 12/400,904, Frictional Device Comprising at Least one Friction Plate, Eckart Gold, Filed Mar. 10, 2009.
U.S. Appl. No. 12/492,261, Friction Materials, Herschel L. McCord, Filed Jun. 26, 2009.
U.S. Appl. No. 10/898,882, Porous Friction Material With Nanoparticles of Friction Modifying Material, Robert C. Lam, Filed Jul. 26, 2004.
U.S. Appl. No. 10/678,598, Mixed Deposit Friction Material, Robert C. Lam, Filed Oct. 3, 2003.
U.S. Appl. No. 10/678,599, High Performance, Durable, Deposit Friction Material, Robert C. Lam, Filed Oct. 3, 2003.
U.S. Appl. No. 10/916,328, High Coefficient Woven Friction Material, Robert C. Lam, Filed Aug. 11, 2004.

* cited by examiner

FRICTION MATERIAL

CROSS REFERENCE TO PRIOR APPLICATION

This application claims the benefit of provisional patent application Ser. No. 60/674,934 filed Apr. 26, 2005 and Ser. No. 60/723,314 filed Oct. 4, 2005.

TECHNICAL FIELD

The present invention relates to a friction material having a fibrous base material. In a preferred embodiment, the fibers have a small diameter and a high tensile modulus resulting in flexible fibers that performs well in a high temperature, high pressure fluid environment.

BACKGROUND OF THE INVENTION

New and advanced continuous torque transmission systems, having continuous slip torque converters and shifting clutch systems are being developed by the automotive industry. These new systems often involve high energy requirements. Therefore, the friction materials technology must be also developed to meet the increasing energy requirements of these advanced systems.

In particular, a new high performance, durable friction material is needed. The new friction material must be able to withstand high speeds wherein surface speeds are up to about 65 m/seconds. Also, the friction material must be able to withstand high facing lining pressure up to about 1500 psi. It is also important that the friction material be useful under limited lubrication conditions.

The friction material must be durable and have high heat resistance in order to be useful in the advanced systems. Not only must the friction material remain stable at high temperatures, it must also be able to rapidly dissipate the high heat that is being generated during operating conditions.

The high speeds generated during engagement and disengagement of the new systems mean that a friction material must be able to maintain a relatively constant friction throughout the engagement. It is important that the friction engagements be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

The friction material must be durable and have high heat resistance in order to be useful in the advanced systems. Not only must the friction material remain stable at high temperatures, it must also be able to repaidly dissipate the high heat that is being generated during operating conditions. The main performance concerns for shifting clutch applications are the coefficient of friction characteristics of the friction material (such that the friction material has a desired torque and holding capacity) and the stability of the friction material such that the friction material does not break down underuse.

For all types of friction materials, in order to be useful in "wet" applications, the friction material must have a wide variety of acceptable characteristics. The friction material must have good anti-shudder characteristics; have high heat resistance and be able to dissipate heat quickly; and, have long lasting, stable and consistent frictional performance. If any of these characteristics are not met, optimum performance of the friction material is not achieved.

Industry continues to search for wet friction material that is resilient or elastic yet resistant to compression set, abrasion and stress; has high heat resistance and is able to dissipate heat quickly; and has long lasting, stable and consistent frictional performance.

BRIEF DESCRIPTION OF THE INVENTION

The friction material of this invention is a wet friction material for use in a fluid environment. The wet material comprises a fibrous base material of small diameter fibers having a fiber diameter ranging from 1 to 20 micrometers, wherein the small diameter fibers have a tensile modulus greater than 70 Gpa. Preferably the fiber diameter ranges from 1 to 10 micrometers and the tensile modulus ranges from 150 to 350 Gpa. Preferably, the small diameter fibers are a combination of small diameter carbon fibers and small diameter ceramic, silica or mineral fibers. The wet friction material of this invention has long lasting, stable and consistent frictional performance in a high energy, high pressure oiled environment. Preferably, the high pressure oiled environment is greater than 4 MPa.

The fibrous base material also may include friction modifying particles. The friction modifying particles may be synthetic graphite, carbon, silica or diatomaceous earth. The fibrous base material also may include at least on inorganic filler. The inorganic filler may be diatomaceous earth, clay, wollastonite, silica, carbonate, vermiculite or mica. Preferably, the small diameter fibers and the inorganic filler have a fiber to filler ratio by weight ranging from 0.5/1 to 8.0/1. The fibrous base material also may include a binder. The binder may be a phenolic or modified phenolic resin, a silicone or modified silicone resin, or a blend of the phenolic and silicone resins. Preferably, the fibrous base material comprises 10 to 70 weight percent of the small diameter fibers.

Other objects and advantages of the present invention will become apparent to those skilled in the art upon a review of the following detailed description of the preferred embodiments and the accompanying drawings.

DETAILED DESCRIPTION OF THE INVENTION

In order to achieve the requirements discussed above, many friction materials were evaluated for friction and heat resistant characteristics under conditions similar to those encountered during operation. Commercially available friction materials were investigated and proved not to be suitable for use in high energy applications.

According to the present invention, a friction material has a uniform dispersion of the curable resin throughout a fibrous base material. In another embodiment, a substantially uniform layer of friction modifying materials may be used on a top or outer surface of the fibrous base material.

Preferably, the fiber diameter of the small diameter fibers ranges from 5 to 10 micrometers. As will be seen in the examples, we used fiber diameter of 5 micrometers and 7 micrometers. Preferably, the tensile modulus of the small diameter fibers ranges from 200 to 300 Gpa. More preferably, the tensile modulus ranges from 250 to 300 Gpa as will be seen in the examples. The small diameter fibers we used are small diameter carbon fibers having a tensile modulus greater than 150 Gpa. Other embodiments used are small diameter mineral fibers or small diameter ceramic or silica fibers.

Preferably, the high pressure oiled environment is greater than 5MPa and more preferably greater than 6MPa. The friction modifying particles preferably have a Mohs hardness of at least 4.5. Preferably, the ratio small diameter fibers to fillers ranges from 0.5/1 to 2.0/1 and more preferably the ratio ranges from 0.8/1 to 1.4/1. The fibrous base material also includes a binder. As will be seen in the examples, the preferred binder is an epoxy modified phenolic resin. More preferably the fibrous base material comprises 20 to 60 weight percent of the small diameter fibers and most preferably, the fibrous base material comprises 30 to 50 weight percent of the small diameter fibers.

Small diameter mineral fibers also may be employed. These fibers are made from vitreous melt, such as rock, slag, glass or other mineral melts. The melt is generally formed by blending rocks or minerals to give the desired analysis. The mineral composition often has an analysis, as oxides, which includes at least 32% $SiO_2$, below 30% $Al_2O_3$ and at least 10% $CaO$.

While the preferred other fibers are carbon fibers, aramid fibers, cellulose fibers, ceramic fibers and silica fibers, other inorganic fibers may be employed. Other useful inorganic filaments for use in the present invention are glass fibers such as fibers formed from quartz, magnesia alumuniosilicate, non-alkaline aluminoborosilicate, soda borosilicate, soda silicate, soda lim-aluminosiliate, lead silicate, non-alkaline lead boroalumina, non-alkaline barium boroalumina, non-alkaline zinc boroalumina, non-alkaline iron aluminosilicate, cadmium borate, alumina fibers, and the like. Typically, the other fibers have a fiber diameter larger than 20 micrometers.

Organo-silane binders may be used on the fibers of this invention. Most organofunctional alkoxysilanes have specific technical applications such as adhesion promoters and surface modification agents.

For example, 3-aminopropyltrialkoxysilanes, 3-aminopropylmethyldialkoxysilanes, N-aminoethyl-3-aminopropyltrimethoxy-silane. N-aminoethyl-3-aminopropyl-meththyldiamethoxysilane, 3-mercaptopropyltrimethorxysilane and 3-methaoxypropyltrimethoxysilane are used as adhesion promoters or as surface modification agents. Compounds such as 3-aminoisobutyltrialkoxysilanes, 3-aminoisobutylmethyldiakloxysilanes, N-(2-aminoethyl)-3-amino-2-methylpropy-lalkoxysilanes and N-(2-aminoethyl) 3-amino-2-methylpropylmethyidialkoxysilanes are also known.

The fibers, especially mineral products, maybe made with a phenol-formaldehyde resin as a curable binder. The phenol-formaldehyde resin contains both phenol and formaldehyde in a molar ratio of 1:2.8 and more, such as up to 1.5. In general the quantity of formaldehyde is over the stoichiometric amount such as in the ratio 1:3.1 to 1:5, for instance 1:3.4. The excess of formaldehyde avoids the possibility of phenol remaining presenting in gaseous form. Other compounds such as ammonia and sugar may be used in preparing the phenolic binder.

Preferably, the fiber/filler ratio ranges from 0.8/1 to 1.4/1. In a specific embodiment, the fiber/filler ratio is 1.09/1.

Typically, the wet friction material includes friction modifying particles deposited on a surface of the base material. Preferably, the particles are synthetic graphite. Inorganic fillers also may be used. The inorganic filler varies broadly and generally is diatomaceous earth, clay, wollastonite, silica, carbonate; vermiculite or mica. The particles have a Mohs hardness of at least 4.5.

The binder may be a phenolic or modified phenolic resin, a silicone or modified silicone resin, or a blend of a phenolic or modified phenolic resin with a silicone or modified silicone resins. Preferably, the binder is an epoxy modified phenolic resin. The wet friction material may be used as a clutch facing, a brake lining. Preferably, the wet friction material comprises 10 to 70 weight percent fibers, 10 to 70 weight percent inorganic filler and 20 to 60 weight percent binder.

In one embodiment we prefer that the small diameter fibers be present on an outer surface of the fibrous base material as the friction material. The friction material typically is for use in engagement with an opposing friction surface. The fibrous base material thus, in contact with the opposing friction surface during the engagement of the friction material with the opposing friction surface. The fibers also may be present in the opposing friction surface. The wet friction material also may comprise a plurality of fibrous base materials with the small diameter fibers being present in any of the layers of the plurality.

In another preferred aspect the petroleum pitch-based carbon fiber comprises a solvated pitch which has a fluid temperature of at least 40° C. lower than the melting point of the same pitch in the nonsolvated state. The petroleum pitch-based fibers are capable of being heated to carbonization temperatures without melting.

In other embodiments, the petroleum pitch-based carbon fibers can be used as a second layer on a fibrous base material which includes further petroleum pitch-based carbon fibers in the fibrous base material.

In yet another embodiment, the petroleum pitch-based carbon fibers are used as a secondary or top layer on an outer surface of a fibrous base material that has no petroleum pitch-based carbon fibers in the fibrous base material. The friction materials having the petroleum pitch-based carbon fiber increases the break away coefficient of friction, thus increasing the holding capacity of the friction material.

In certain embodiments, the petroleum pitch-based carbon fiber can be used as a top or secondary layer on an inexpensive porous material comprising, for example cotton and cellulose filler material.

The small diameter fibers may be present in a typical formulation such as in the range of about 15 to about 20%, by weight. Further other suitable materials may be present in the fibrous base material. Such non-limiting examples include all foreseeable non-woven materials including wet laid, dry laid, needle punch, knit, and stitch bonded non-woven materials. It is also within the contemplated scope of the present invention that other foreseeable forms of wet friction materials can be used. It is also within the contemplated scope of the present invention that the petroleum pitch-based carbon fiber can be used alone or blended with other fibers and fillers.

Figure 1:
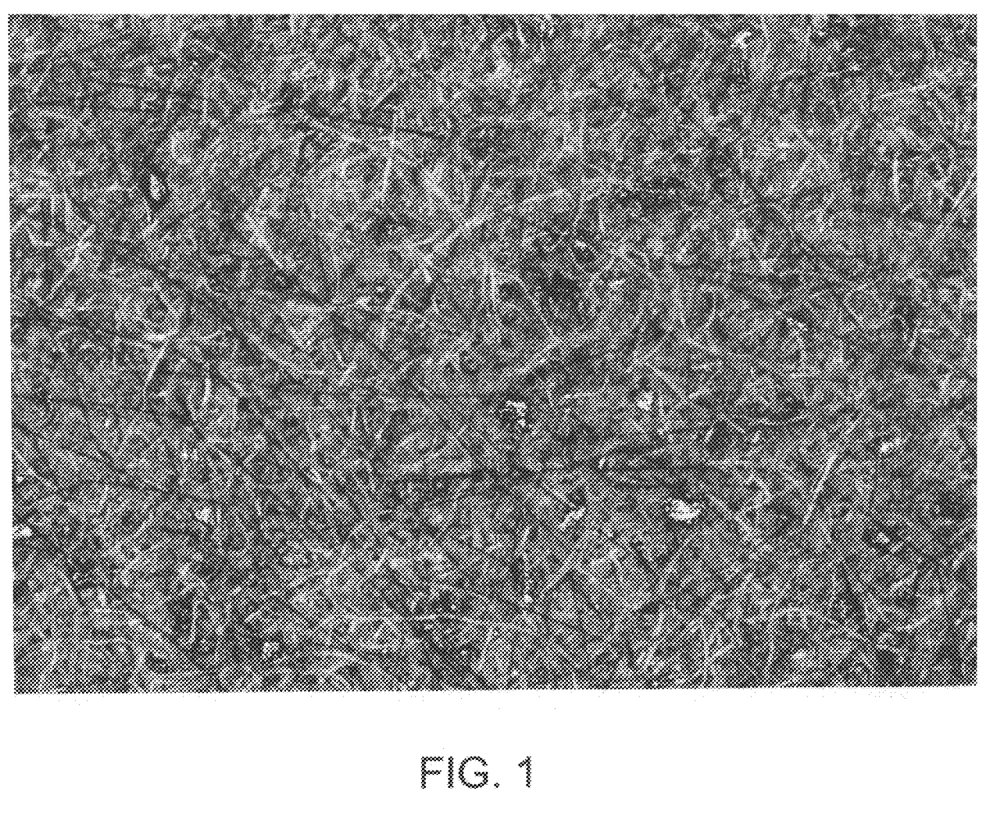
FIG. 1 shows optical microcopy analysis of a friction material using small diameter carbon fibers according to this invention.

FIG. 1 shows optical microcopy analysis of friction material using small diameter carbon fibers according to this invention. The carbon fibers used to make this friction paper had a fiber diameter of 5 micrometers. A typical fibers of this type is Pyrofil™ carbon fiber from Grafil, Inc.

Figure 2:
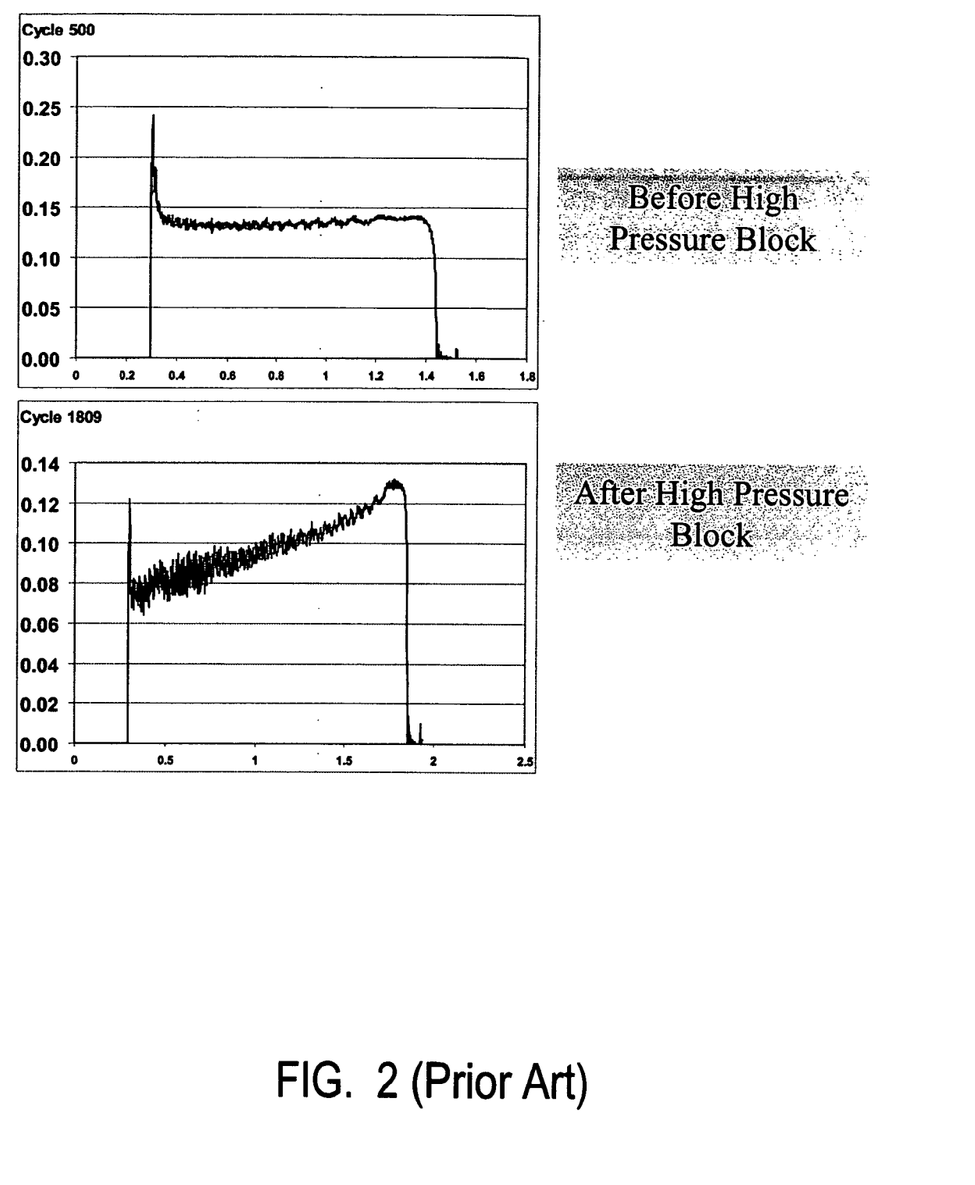
FIG. 2 shows SAE screening test data of prior art friction material using standard large diameter fibers.

FIG. 2 shows SAE screening test data of prior art friction material using standard large diameter fibers. The coefficient of friction curve shows poor performance after repeated cycles. The changing curve after high pressure block demonstrates poor durability.

Figure 3:
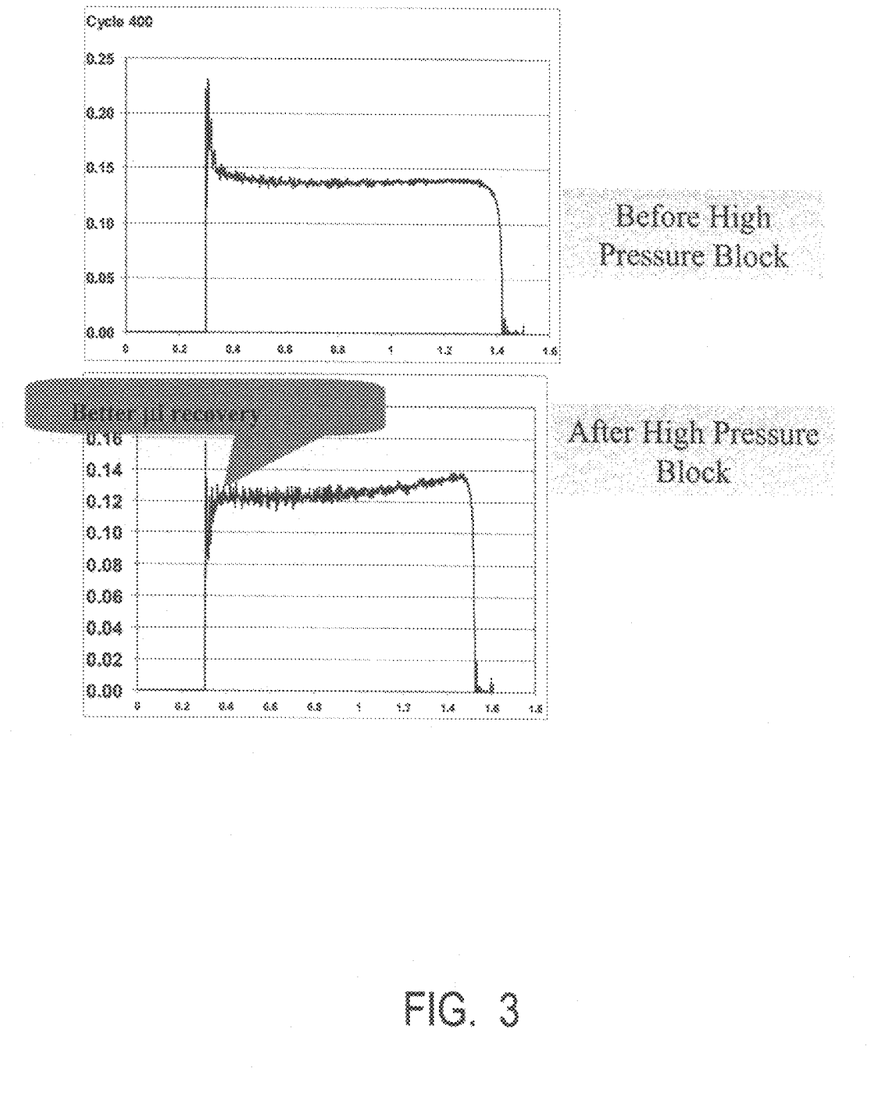
FIG. 3 shows SAE screening test data for friction material using small diameter carbon fibers according to this invention.

FIG. 3 shows SAE screening test data for friction material using small diameter carbon fibers according to this invention. The coefficient of friction curve shows better recovery after repeated cycles. The constant curve shows better recovery. The carbon fibers used in this test had a fiber diameter of 5 micrometers. The carbon fiber used was from Hexcel Corporation.

Figure 4:
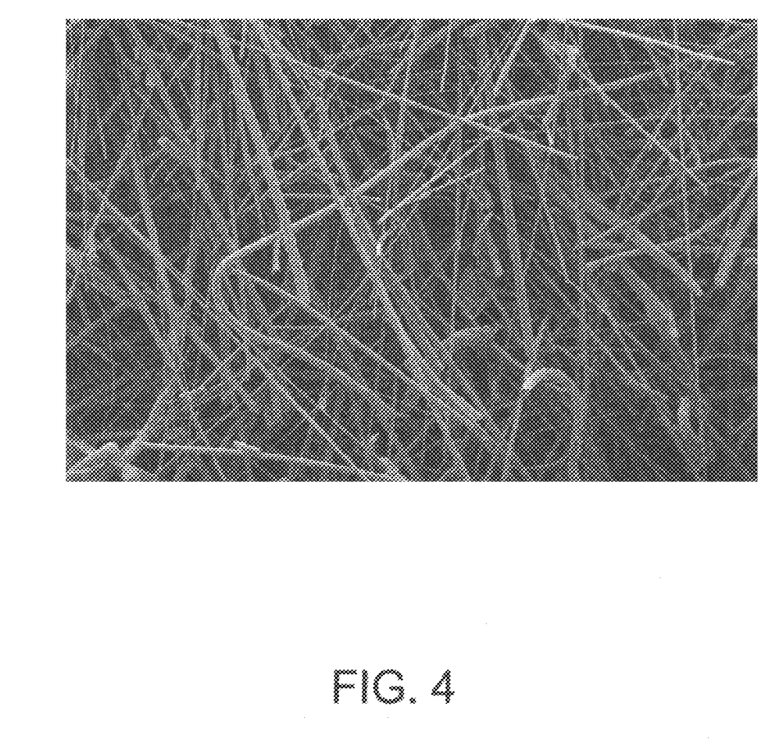
FIG. 4 is a SEM image of a cross-section of smaller diameter mineral fibers according to the invention.

FIG. 4 is a SEM image of a cross-section of small diameter mineral fibers according to the invention. The fibers shown are engineered mineral fibers having diameters ranging from 5 to 10 micrometers. The fiber are from Lapinus Fibers B.V., which is a part of Rockwool International Group.

Figure 5:
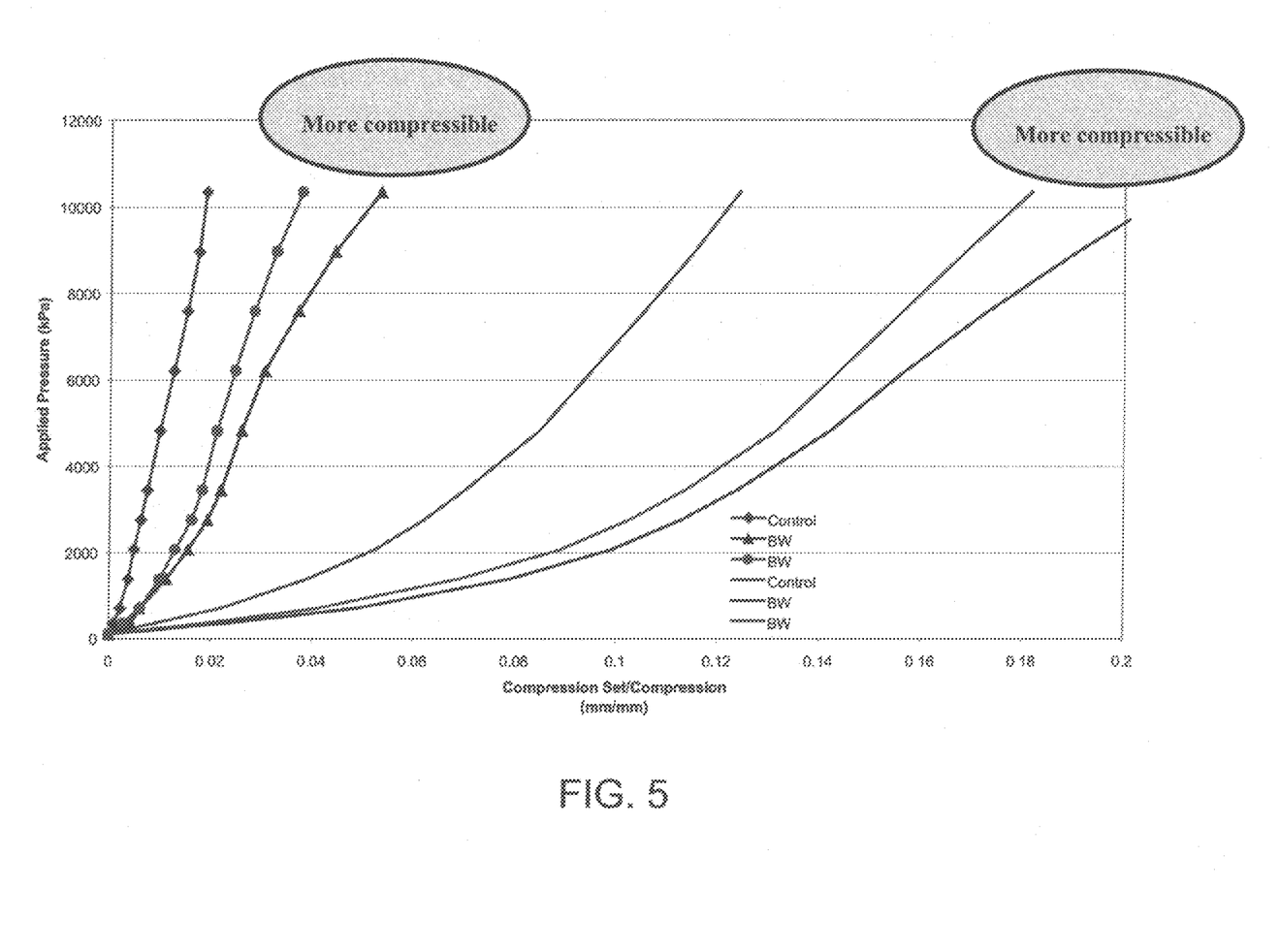
FIG. 5 shows material properties between friction materials of a prior art control of standard large diameter fibers and small diameter mineral fibers according to this invention.

FIG. 5 shows material properties between friction materials of a prior art control of standard large diameter standard and small diameter mineral fibers according to this invention. The inventive fibers are engineered mineral fibers from Lapinus having a diameter ranging from 5 to 10 micrometers. The curves show that the inventive fibers are more compressible than the prior art fibers.

Figure 6:
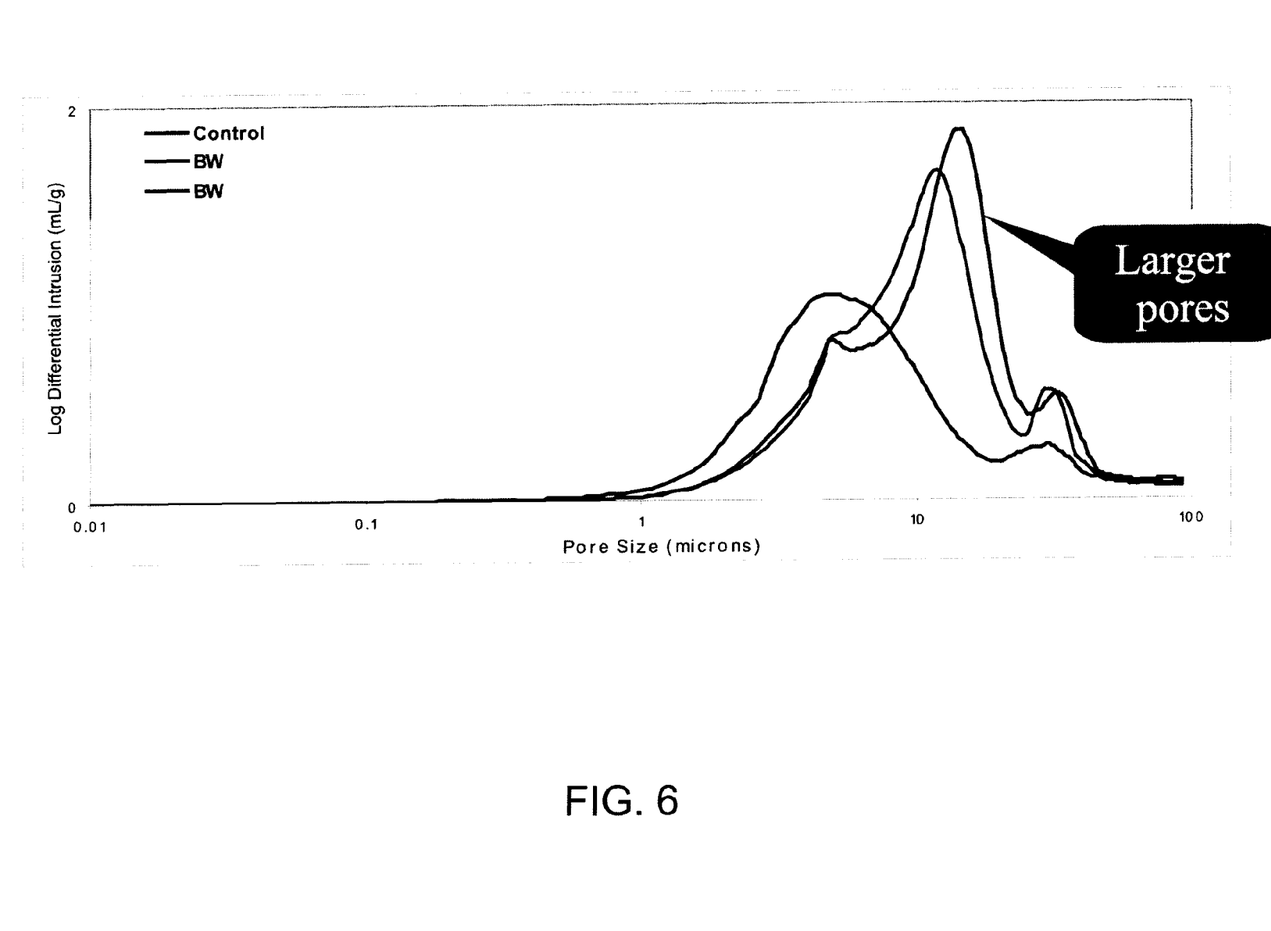
FIG. 6 shows material properties between friction materials of a prior art control of standard large diameter fibers and small diameter mineral fibers according to this invention.

FIG. 6 shows material properties between friction materials of a prior art control of standard large diameter fibers and small diameter mineral fibers according to this invention. The inventive fibers are engineered mineral fibers from Lapinus having a fiber diameter ranging from 5 to 10 micrometers. The inventive fibers produce friction materials produce friction materials having larger pores and demonstrate better material properties as shown by the following measurements.

Figure 7:
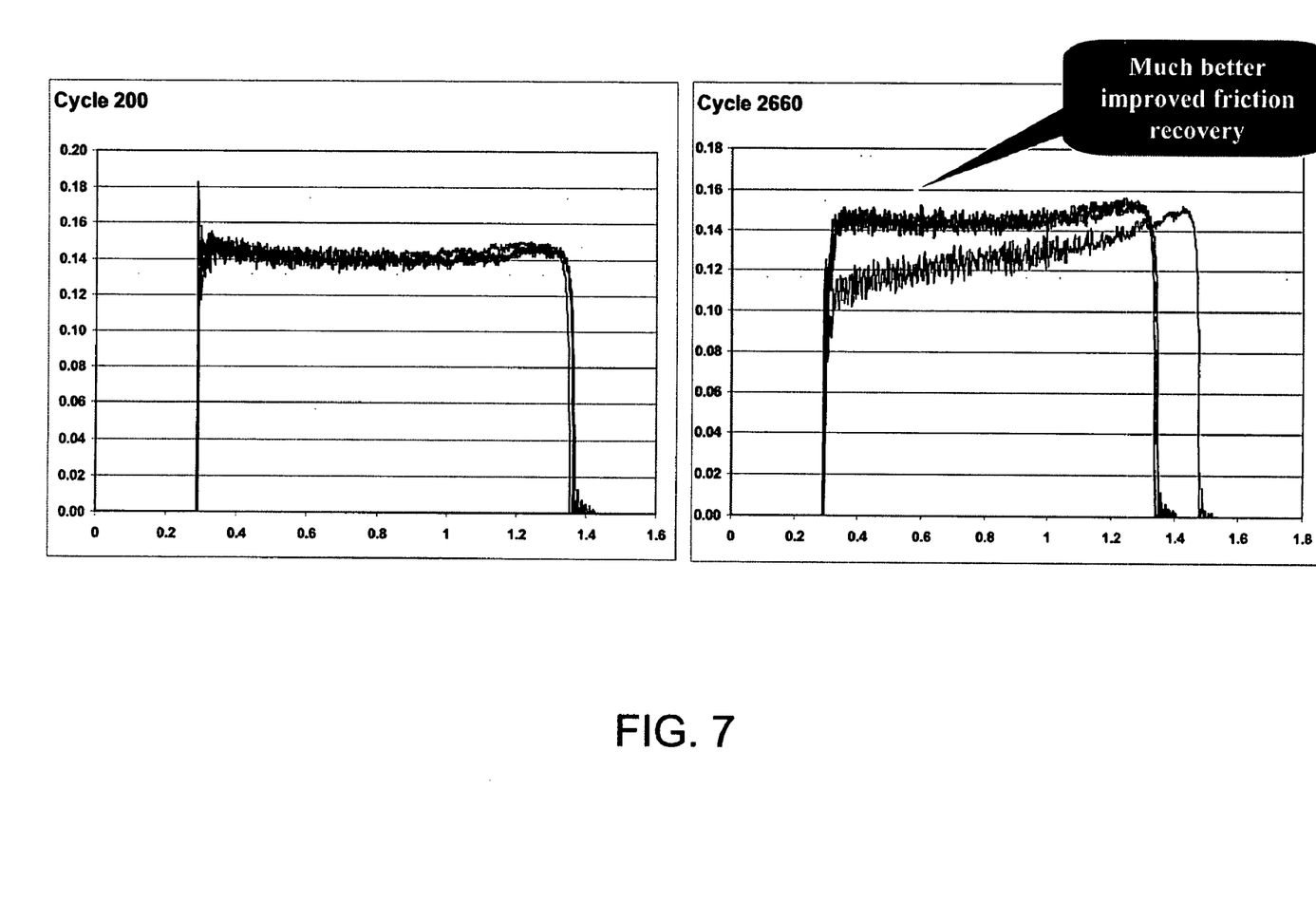
FIG. 7 shows SAE screening test data of prior art friction material using standard large diameter fibers and small diameter mineral fibers according to the invention.

FIG. 7 shows SAE screening test data of prior art friction material using standard large diameter fibers and small diameter mineral fibers according to the invention. The inventive fibers are engineered mineral fibers from Lapinus having a fiber diameter ranging from 5 to 10 micrometers. The inventive fibers have improved friction recovery after repeated cycles.

Figure 8:
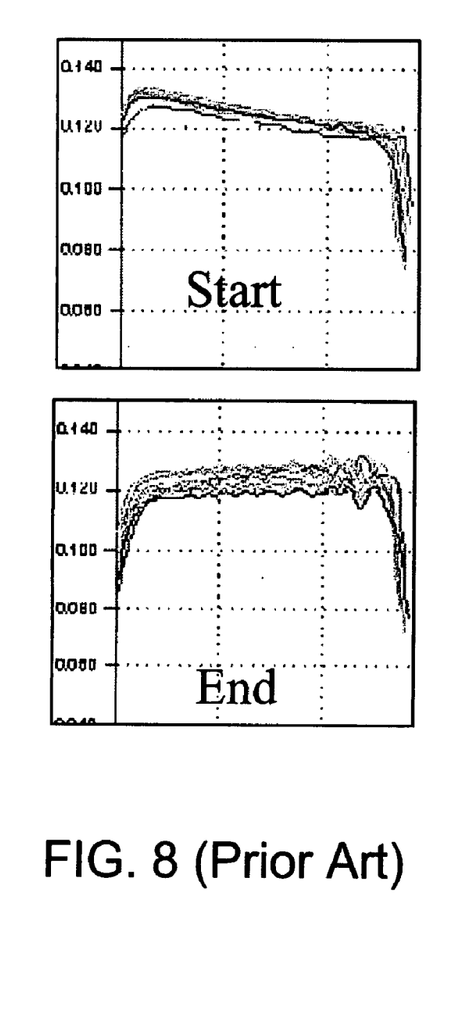
FIG. 8 (prior art) shows a pair of graphs depicting high hot spot wear for a standard large diameter fiber.

FIG. 8 (prior art) shows a pair of graphs depicting high hot spot wear for a standard large diameter fiber. The data demonstrates hot spots with high wear (2.4 mm) in depth.

Figure 9:
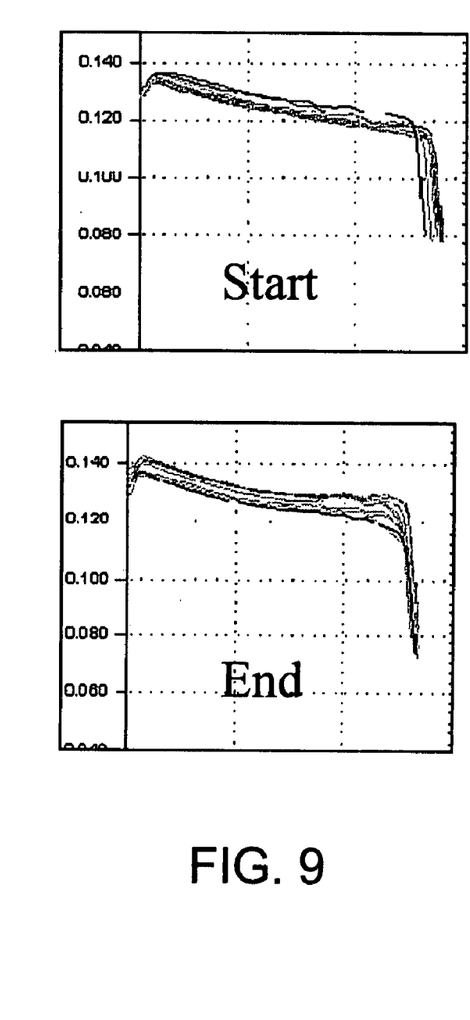
FIG. 9 shows a pair of graphs depicting low hot spot wear for small diameter carbon fibers according to this invention.

FIG. 9 shows a pair of graphs depicting low hot spot wear for small diameter carbon fibers according to this invention. The data demonstrates no hot spots and low wear of only 1.1 mm in depth.

In certain embodiments, the carbon fiber is made from a solvated isotropic pitch which has a fluid temperature of at least about 400° C. lower, and often 200° C. or more, than the melting point of the same pitch in the non-solvated state. Fibers made from this solvated isotropic pitch have desirable improved stabilization characteristics such that the fibers can be heated to carbonization temperatures without melting. Further, any mesophase present in the carbon fibers is not highly elongated by shear forces associated with the formation of the carbon fibers. Further, preferred petroleum pitch-based carbon fibers have about 5 to about 40% solvent, by weight, where the pitch fiber is unmeltable upon removable of the solvent from the fiber.

The petroleum pitch-based carbon fibers preferably have a softening point in excess of 300° C. and preferably greater than 350° C. such that the fibers are capable of being subjected to a stabilization process at temperatures greater than a fibrous spinning temperature. It was not until the present invention that such petroleum based carbon fibers were used in a friction material.

Still further, "pitch" generally refers to by-products in the production of natural asphalt petroleum pitches and heavy oil obtained as a by-product in naphtha cracking industry and pitches of high carbon content obtained from coal. Petroleum pitch generally refers to the residual carbonaceous material obtained from the catalytic and/or thermal cracking of petro-

| Sample | Porosity= % | Median Pore Diameter (Volume)= μm | Bulk Density at 0.42 psia g/mL | Apparent (skeletal) Density= g/mL | Total Intrusion Volume= mL/g | Threshold Pressure: psia |
|---|---|---|---|---|---|---|
| Control | 60.17 | 5.80 | 0.6768 | 1.6990 | 0.8889 | 5.47 |
| BW | 67.16 | 12.04 | 0.5749 | 1.7503 | 1.1682 | 11.78 |
| BW | 63.68 | 10.28 | 0.5935 | 1.6340 | 1.0729 | 6.07 |

The use of small diameter fibers in a fibrous base material improves the friction material's ability to withstand high temperatures. The use of the small diameter fibers provides a friction material having a more porous structure; i.e., there are larger pores than if a typical fiber is used. The porous structure is generally defined by the pore size and liquid permeability. In certain embodiments, the fibrous base material defines pores ranging in mean average size from about 2.0 to about 25 microns in diameter. In certain embodiments, the mean pore size ranges from about 2.5 to about 8 microns in diameter and the friction material had readily available air voids of at least about 50% and, in certain embodiments, at least about 60% or higher, an in certain embodiments up to and including about 85%.

leum distillates or residues. Solvated pitches generally contain between about 5 to about 40% by wt. of solvent in the pitch and have a fluid temperature lower than the melting point of a pitch component when not associated with solvent. Typically the fluid temperature is lower than about 40° C. The fluid temperature for a solvated pitch is generally determined in the industry to be the temperature at which the viscosity of 6000 poise is registered upon cooling the solvated pitch at 1° C. per minute from a temperature in excess of its melting point. The solvent content refers to a value determined by weight loss on vacuum separation of the solvent.

Typically small diameter mineral fibers according to this invention have the following properties:

| Parameter | Ranges | Actual |
|---|---|---|
| Mineral Fiber diameter (um) | Less than 20 | 5-10 |
| Mineral Fiber Length (mm) | 0.05 to 6 | 0.2-0.7 |
| Mineral Fiber modulus (Gpa) | | |
| Fiber(all)/filler(diatom) ratio | 0.8-9 | 71/19 = 3.74 |
| Filler (diatom) range | 10-50 | 19 |
| Surface treatment | Silane, Cationic | |
| Max short (%) | | 0.20% |

An engineered mineral fiber we used from Lapinus Fibers had the following properties: treated with surfactant for good water dispersion designed for wet paper process (gasket application) fiber diameter: <μm; Length: 650+/−150 μm.

Another engineered mineral fiber from Lapinus Fiber that we used had the following properties: treated with silane coupling agent for good bonding to phenolic resin designed for brake application short fiber length for easy mixing (no drawings) fiber diameter: <10 μm; Length 230+/−50 μm.

Various types of friction modifying particles may be useful in the friction material. Useful friction modifying particles include silica particles. Other embodiments may have friction modifying particles such as resin powders such as phenolic resins; silicone resins epoxy resins and mixtures thereof. Still other embodiments may include partial and/or fully carbonized carbon powders and/or particles and mixtures thereof; and mixtures of such friction modifying particles. In certain embodiments, silica particles such as diatomaceous earth, Celite®, Celatom®, and/or silicon dioxide may be especially useful. The silica particles are inexpensive inorganic materials which bond strongly to the base material. The silica particles provide high coefficients of friction to the friction material. The silica particles also provide the base material with a smooth friction surface and provide a good "shift feel" and friction characteristics to the friction material such that any "shudder" is minimized.

The friction material also may be impregnated using different resin systems. In certain embodiments, at least one phenolic resin, at least one modified phenolic-based resin, at least one silicone resin, at least one modified epoxy resin, and/or combinations of the above may be used. In certain other embodiments, a silicone resin blended or mixed with a phenolic resin in compatible solvents is useful.

Various resins are useful in the present invention. The resin may comprise phenolic or phenolic based resins, preferably so that the saturant material comprises about 45 to about 65 parts, by weight, per 100 parts, by weight, of the friction material. After the resin mixture has been applied to the fibrous base material and the fibrous base material has been impregnated with the resin mixture, the impregnated fibrous base material is heated to a desired temperature for a predetermined length of time to form a friction material. The heating cures the phenolic resin present in the saturant at a temperature of about 300° F. When other resins are present in the saturant, such as a silicone resin, the heating cures the silicone resin at a temperature of about 400° F. Thereafter, the cured friction material is adhered to a desired substrate by suitable means.

Various useful resins include phenolic resins and phenolic-based resins. Various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the mixture includes reins blend containing about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are fully disclosed in the above-referenced BorgWarner U.S. patents which are fully incorporated herein, by reference. Another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound may provide higher heat resistance to the friction material than the phenolic resin alone.

EXAMPLES

The following examples illustrate various embodiments of the present invention. It should be understood, however, that other embodiments not shown in the following examples are also contemplated as being within the scope of the present invention.

Example 1

In certain embodiments, the friction material can comprise a fibrous base material comprising, by weight percent: about 20 to about 60% fibrillated aramid fibers, about 10 to about 30% silica filler material, about 10 to about 20% graphite, and about 5 to about 20% small diameter sized petroleum pitch-based carbon fibers. One embodiment of the present invention comprises fibrillated aramid fiber at about 50%, silica filler at about 20%, graphite at about 15%, small diameter petroleum pitch-based carbon fiber at about 15%, and optionally latex at about 2% add on was used to make a fibrous base material having a basis weight of about 155 lb/3000 ft² and having a caliper of about 29 mils.

FIG. 5 is a test showing a shifting clutch application showing a coefficient of friction for two examples of small diameter carbon fibers and a comparative larger diameter standard carbon fiber for different cycles. The results clearly show improved compressive strength for the small diameter carbon fibers, without a loss in coefficient of friction properties.

The resin mixture comprises desired amounts of the resin and the friction modifying particles such that the target pick up of resin by the fibrous base material ranges from about 25 to about 70%, in other embodiments, from about 40 to about 65%, and, in certain embodiments, about 60 to at least 65%, by weight, total silicone-phenolic resin. After the fibrous base material is saturated with the resin, the fibrous base material is cured for a period of time (in certain embodiments for about ½ hour) at temperatures ranging between 300-400° C. to cure the resin binder and form the friction material. The final thickness of the friction material depends on the initial thickness of the fibrous base material.

Other ingredients and processing aids known to be useful in both preparing resin blends and in preparing fibrous base materials can be included, and are within the contemplated scope of the present invention.

The friction material of the present invention may include a layer of friction modifying particles on a top surface of a fibrous base material provides a friction material with good anti-shudder characteristics, high resistance, high coefficient of friction, high durability, good wear resistance and improved break-in characteristics.

Example 2

In certain embodiments, the friction material can comprise a fibrous base material comprising, by weight percent: about 20 to about 60% fibrillated aramid fibers, about 10 to about 30% silica filler material, about 10 to about 20% graphite, and about 5 to about 20% small diameter mineral fibers.

FIG. 6 is a test showing material properties for coefficient of friction for examples of small diameter mineral fibers and prior art larger diameter conventional fibers.

Example 3

In certain embodiments, the friction material can comprise a fibrous base material comprising, by weight percent: about 20 to about 60% fibrillated aramid fibers, about 10 to about 30% silica filler material, about 10 to about 20% graphite, and about 5 to about 20% small diameter ceramic fibers.

FIG. 7 is a test showing coefficient of friction for examples of small diameter mineral fibers having improved friction recovery over larger diameter conventional fibers.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A wet friction material for use in a fluid environment comprising a fibrous base material comprising small diameter fibers having a diameter ranging from 1 to 20 micrometers and large diameter fibers having a diameter greater than 20 micrometers, wherein the small diameter fibers comprise a combination of carbon fibers and at least one of ceramic fibers, silica fibers, or mineral fibers, wherein each of the small diameter fibers has a tensile modulus greater than 70 Gpa.

2. A wet friction material according to claim 1 wherein the diameter of the small diameter fibers ranges from 1 to 10 micrometers.

3. A wet friction material according to claim 1 wherein the diameter of the small diameter fibers ranges from 5 to 10 micrometers.

4. A wet friction material according to claim 1 wherein the diameter of the small diameter fibers is 5 micrometers.

5. A wet friction material according to claim 1 wherein the diameter of the small diameter fibers is 7 micrometers.

6. A wet friction material according to claim 1 wherein the tensile modulus ranges from 150 to 350 Gpa.

7. A wet friction material according to claim 1 wherein the tensile modulus ranges from 200 to 300 Gpa.

8. A wet friction material according to claim 1 wherein the tensile modulus ranges from 250 to 300 Gpa.

9. A wet friction material according to claim 1 wherein the carbon fibers have a tensile modulus greater than 150 Gpa.

10. A wet friction material according to claim 9 wherein the small diameter fibers comprise ceramic fibers having a tensile modulus ranging from 70 to 100 Gpa.

11. A wet friction material according to claim 1 wherein the fluid environment has a pressure greater than 4 MPa.

12. A wet friction material according to claim 1 wherein the fluid environment has a pressure greater than 5 MPa.

13. A wet friction material according to claim 1 wherein the fluid environment has a pressure greater than 6 MPa.

14. A wet friction material according to claim 1 wherein the large diameter fibers comprise at least one of carbon fibers, aramid fibers, cellulose fibers, ceramic fibers, silica fibers, or glass fibers.

15. A wet friction material according to claim 1 wherein the fibrous base material further includes friction modifying particles.

16. A wet friction material according to claim 15 wherein the friction modifying particles comprise at least one of synthetic graphite, carbon, silica or diatomaceous earth.

17. A wet friction material according to claim 15 wherein the friction modifying particles have a Mohs hardness of at least 4.5.

18. A wet friction material according to claim 1 wherein the fibrous base material further comprises at least one inorganic filler.

19. A wet friction material according to claim 18 wherein the inorganic filler comprises at least one of diatomaceous earth, clay, wollastonite, silica, carbonate, vermiculite or mica.

20. A wet friction material according to claim 18 wherein the small diameter fibers and the inorganic filler have a fiber to filler ratio by weight ranging from 0.5/1 to 8.0/1.

21. A wet friction material according to claim 20 wherein the fiber to filler ratio ranges from 0.5/1 to 2.0/1.

22. A wet friction material according to claim 20 wherein the fiber to filler ratio ranges from 0.8/1 to 1.4/1.

23. A wet friction material according to claim 1 wherein the fibrous base material is impregnated with a curable resin.

24. A wet friction material according to claim 23 wherein the curable resin comprises at least one of a phenolic or modified phenolic resin, a silicone or modified silicone resin, or a blend of a phenolic or a modified phenolic resin with a silicone or a modified silicon resin.

25. A wet friction material according to claim 23 wherein the curable resin is an epoxy modified phenolic resin.

26. A wet friction material according to claim 1 wherein the fibrous base material comprises 10 to 70 weight percent of the small diameter fibers.

27. A wet friction material according to claim 1 wherein the fibrous base material comprises 30 to 50 weight percent of the small diameter fibers.

28. A clutch facing comprising the wet friction material of claim 1.

29. A brake lining comprising the wet friction material of claim 1.

30. A friction material for use in a high pressure oiled environment comprising a fibrous base material impregnated with a cured resin material, the fibrous base material comprising small diameter fibers, large diameter fibers, friction modifying particles, and an inorganic filler, the small diameter fibers comprising petroleum pitch-based carbon fibers and mineral fibers each having a diameter ranging from 1 to 20 micrometers and a tensile modulus of greater than 70 Gpa, the large diameter fibers having a diameter greater than 20 micrometers, the resin material comprising about 45 to about 65 parts per 100 parts, by weight, of the friction material, the friction material further defining pores having a median pore diameter of at least 10 micrometers and a porosity of at least 60%, wherein the small diameter fibers and the inorganic filler are present at a fiber to filler ratio ranging, by weight, from 0.8/1 to 1.4/1, and wherein the oiled environment has a pressure of at least 4 MPa.

31. A friction material according to claim 30 wherein the small diameter fibers further comprise at least one of ceramic fibers, silica fibers, or combinations thereof.

32. A friction material according to claim 30 wherein the friction modifying particles are deposited on an outer surface of the fibrous base material for contacting an opposed friction surface.

33. A friction material for use in a high pressure oiled environment comprising a fibrous base material and a secondary layer present on an outer surface of the fibrous base material, the fibrous base material and the secondary layer being impregnated with a cured resin material, the fibrous base material comprising small diameter fibers and large diameter fibers, the small diameter fibers each having a diameter ranging from 1 to 20 micrometers and a tensile modulus of greater than 70 Gpa, wherein the small diameter fibers comprise a combination of carbon fibers and at least one of ceramic fibers, silica fibers, or mineral fibers, and the large diameter fibers having a diameter greater than 20 micrometers, the secondary layer comprising petroleum pitch-based carbon fibers for engagement with an opposing friction surface, the petroleum pitch-based carbon fibers having a diameter ranging from 1 to 20 micrometers and a tensile modulus of greater than 70 Gpa, and wherein the fibrous base material is substantially free of petroleum pitch-based carbon fibers.

34. A friction material according to claim 33 wherein the petroleum pitch-based carbon fibers are made from solvated pitch.

35. A friction material according to claim 33 wherein the small diameter fibers of the fibrous base material comprise carbon fibers having a tensile modulus greater than 150 GPa, ceramic fibers having a tensile modulus ranging from 70 to 100 GPa, and mineral fibers.

* * * * *